(12) United States Patent
Chen et al.

(10) Patent No.: US 12,505,694 B2
(45) Date of Patent: Dec. 23, 2025

(54) BIOMETRIC IDENTIFICATION DEVICE

(71) Applicant: AUO Corporation, Hsin-Chu (TW)

(72) Inventors: Yan-Liang Chen, Hsin-Chu (TW); Tsu-Chien Tung, Hsin-Chu (TW); Mei-Lien Huang, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 657 days.

(21) Appl. No.: 17/860,132

(22) Filed: Jul. 8, 2022

(65) Prior Publication Data

US 2023/0034318 A1 Feb. 2, 2023

Related U.S. Application Data (60) Provisional application No. 63/224,977, filed on Jul. 23, 2021.

(30) Foreign Application Priority Data

Nov. 30, 2021 (TW) .................................. 110144702

(51) Int. Cl.
   *G06V 40/13* (2022.01)
   *G06V 10/147* (2022.01)
   *H10F 39/00* (2025.01)
(52) U.S. Cl.
   CPC ........ *G06V 40/1318* (2022.01); *G06V 10/147* (2022.01); *H10F 39/8033* (2025.01); *H10F 39/8057* (2025.01)

(58) Field of Classification Search
   CPC .. G06V 10/14; G06V 10/147; G06V 40/1318; G06V 40/1324; H10F 39/8033; H10F 39/8057
   See application file for complete search history.

(56) References Cited

U.S. PATENT DOCUMENTS

| | | |
|---|---|---|
| 2018/0211085 A1 | 7/2018 | Liu et al. |
| 2020/0327296 A1 | 10/2020 | Wu et al. |
| 2021/0397806 A1 | 12/2021 | Lu et al. |

(Continued)

FOREIGN PATENT DOCUMENTS

| | | |
|---|---|---|
| CN | 108427908 A | 8/2018 |
| CN | 210038821 U | 2/2020 |

(Continued)

*Primary Examiner* — Nelson Garces
(74) *Attorney, Agent, or Firm* — WPAT, PC (57) ABSTRACT

A biometric identification device is provided. Photosensitive devices are disposed on the substrate. The first dielectric layer is disposed on the photosensitive devices. The first light-shielding parts are disposed on the first dielectric layer. Each of the first light-shielding parts has a first light-transmitting area and a first light-shielding area surrounding the first light-transmitting area. The first light-transmitting area corresponds to and overlaps with the photosensitive device, and at least two of the first light-shielding parts are spaced apart by a spacer area. The second dielectric layer is disposed on the first light-shielding parts. The second light-shielding part is disposed on the second dielectric layer. An orthogonal projection of at least a part of the spacer area on the substrate is within an orthogonal projection of a second light-shielding area on the substrate.

18 Claims, 8 Drawing Sheets

(56) References Cited

U.S. PATENT DOCUMENTS

2022/0216351 A1* 7/2022 Wan .................. H10F 77/331
2022/0221634 A1* 7/2022 Lius .................. G01J 3/2803
2022/0238586 A1* 7/2022 Liu ................... G06V 40/1318

FOREIGN PATENT DOCUMENTS

| | | |
|---|---|---|
| CN | 111164608 A | 5/2020 |
| CN | 111680630 A | 9/2020 |
| CN | 113065469 A | 7/2021 |
| CN | 113066833 A | 7/2021 |
| TW | I748851 B | 12/2021 |

\* cited by examiner

BIOMETRIC IDENTIFICATION DEVICE

RELATED APPLICATIONS

This application claims priority to U.S. Provisional Application Ser. No. 63/224,977, filed Jul. 23, 2021, and Taiwan Application Serial Number 110144702, filed Nov. 30, 2021, the disclosures of which are incorporated herein by reference in their entireties.

BACKGROUND

Field of Invention

The present disclosure relates to a biometric identification device.

Description of Related Art

With the development of science and technology, information security has become an important consideration for consumers when using electronic devices. Therefore, most electronic devices are currently equipped with an identity authentication mechanism, and the method of utilizing biometrics for identity recognition has become a trend in recent years.

However, the current biometric identification devices have the problem of poor images due to excessively high stray capacitance and insufficient response to biometric signals.

For the foregoing reason, there is a need to solve the above-mentioned problem by providing a biometric identification device with a reduced stray capacitance.

SUMMARY

Some embodiments of the present disclosure provide a biometric identification device. The biometric identification device includes a substrate, a plurality of photosensitive devices, a first dielectric layer, a plurality of first light-shielding parts, a second dielectric layer, and a second light-shielding part. The photosensitive devices are disposed on the substrate. The first dielectric layer is disposed on the photosensitive devices. The plurality of first light-shielding parts are disposed on the first dielectric layer. Each of the first light-shielding parts has a first light-transmitting area and a first light-shielding area surrounding the first light-transmitting area. The first light-transmitting area respectively corresponds to and overlaps with each of the photosensitive devices, and at least two of the first light-shielding parts are spaced apart by a spacer area. The second dielectric layer is disposed on the first light-shielding parts. The second light-shielding part is disposed on the second dielectric layer. The second light-shielding part has a plurality of second light-transmitting areas and a second light-shielding area located between two adjacent second light-transmitting areas. Each of the second light-transmitting areas respectively corresponds to the first light-transmitting area, and an orthogonal projection of at least a part of the spacer area on the substrate is within an orthogonal projection of the second light-shielding area on the substrate.

In the foregoing, the first light-shielding parts are all spaced apart by the spacer area.

In the foregoing, a part of the first light-shielding parts are connected through the first light-shielding area.

In the foregoing, a material of the first light-transmitting area is a metal.

In the foregoing, a range of a length of the first light-transmitting area is from 2.5 µm to 5 µm.

In the foregoing, a contour shape of the first light-shielding area includes a circle, a square, a pentagon, a hexagon, or an octagon when viewed from a top.

In the foregoing, a distance between center points of the two adjacent second light-transmitting areas is defined as P, a length of each of the second light-transmitting areas is L2, a length of the spacer area is S0, a length of the first light-transmitting area is L1, a vertical length from a contour edge of the first light-shielding area to a contour edge of the first light-transmitting area is L', and a length of a light range projected onto each of the plurality of photosensitive devices through a microlens is L0, then P−L2>S0; P−L1−2L'=S0 ; and L1+2L'>L0.

In the foregoing, a range of the length S0 of the spacer area is 10 µm≥S0≥2.5 µm; and a range of the vertical length L' from the contour edge of the first light-shielding area to the contour edge of the first light-transmitting area is 10 µm≥L'≥2.5 µm.

In the foregoing, a range of the length L2 of each of the plurality of second light-transmitting areas is 10 µm≥L2≥2.5 µm; a range of the length L1 of the first light-transmitting area is 8 µm≥L1≥2.5 µm; a range of the length L0 of the light range is 10 µm≥L0≥2.5 µm; a range of the distance H0 from the top surface of each of the plurality of photosensitive devices to the top surface of the first dielectric layer is 6 µm≥H0≥2 µm; and a range of the distance H1 from the top surface of the first dielectric layer to the top surface of the second dielectric layer is 30 µm≥H1≥5 µm.

In the foregoing, a distance between center points of the two adjacent second light-transmitting areas is defined as P, a length of each of the second light-transmitting areas is L2, a length of the spacer area is S0, a length of the first light-transmitting area is L1, a vertical length from a contour edge of the first light-shielding area to a contour edge of the first light-transmitting area is L', a length of a light range projected onto each of the plurality of photosensitive devices through a microlens is L0, a distance from a top surface of each of the photosensitive devices to a top surface of the first dielectric layer is H0, and a distance from the top surface of the first dielectric layer to a top surface of the second dielectric layer is H1, then $$L' \leq \frac{L0}{2} - \frac{L1}{2} + \frac{\left(P + \frac{L2}{2} - \frac{L0}{2}\right)H0}{H0 + H1}.$$

In the foregoing, a range of the length S0 of the spacer area is 10 µm≥S0≥2.5 µm; and a range of the vertical length L' from the contour edge of the first light-shielding area to the contour edge of the first light-transmitting area is 10 µm≥L'≥2.5 µm.

In the foregoing, a range of the length L2 of each of the second light-transmitting areas is 10 µm≥L2≥2.5 µm; a range of the length L1 of the first light-transmitting area is 8 µm≥L1≥2.5 µm; a range of the length L0 of the light range is 10 µm≥L0≥2.5 µm; a range of the distance H0 from the top surface of each of the photosensitive devices to the top surface of the first dielectric layer is 6 µm≥H0≥2 µm; and a range of the distance H1 from the top surface of the first dielectric layer to the top surface of the second dielectric layer is 30 µm≥H1≥5 µm.

In the foregoing, the first light-shielding area includes a first light-shielding metal layer and a first metal oxide layer disposed on the first light-shielding metal layer.

In the foregoing, the second light-shielding area includes a second light-shielding metal layer and a second metal oxide layer disposed on the second light-shielding metal layer.

In the foregoing, the biometric identification device further includes an active device connected to the photosensitive devices.

In the foregoing, the biometric identification device further includes a microlens disposed above the second light-shielding part. Orthogonal projections of the second light-transmitting areas on the substrate are within an orthogonal projection of the microlens on the substrate.

In the foregoing, the biometric identification device further includes a plurality of microlenses disposed above the second light-shielding part. Each of the microlenses respectively corresponds to each of the second light-transmitting areas.

Some embodiments of the present disclosure provide a biometric identification device, including a substrate, a plurality of photosensitive devices, a first dielectric layer, a plurality of first light-shielding parts, a second dielectric layer and a second light-shielding part. A plurality of photosensitive devices is disposed on the substrate. A first dielectric layer is disposed on the plurality of photosensitive devices. A plurality of first light-shielding parts are disposed on the first dielectric layer, in which each of the plurality of first light-shielding parts has a first light-transmitting area and a first light-shielding area surrounding the first light-transmitting area, the first light-transmitting area respectively corresponds to and overlaps with each of the plurality of photosensitive devices, and the plurality of first light-shielding parts are all spaced apart by a spacer area; a second dielectric layer disposed on the plurality of first light-shielding parts. A second light-shielding part is disposed on the second dielectric layer, in which the second light-shielding part has a plurality of second light-transmitting areas and a second light-shielding area located between two adjacent second light-transmitting areas, and each of the plurality of second light-transmitting areas respectively corresponds to the first light-transmitting area.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. Single forms used in the present specification such as "a", "one" and "the" includes multiple forms such as "at least one"; "or" represents "and/or" unless described clearly. As used herein, the term "and/or" includes any and all combinations of one or more of the associated listed items. It will be further understood that the terms "comprises", "comprising", and/or "has", "have", "having" when used in this specification, specify the presence of stated features, areas, integers, steps, operations, elements, and/or components, but do not preclude the presence or addition of one or more other features, areas, integers, steps, operations, elements, components, and/or groups thereof.

Embodiments of the present disclosure are described herein with reference to top illustrations that are schematic illustrations of idealized embodiments of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Therefore, the scope of the present disclosure is to be limited only by the appended claims.

Figure 1:
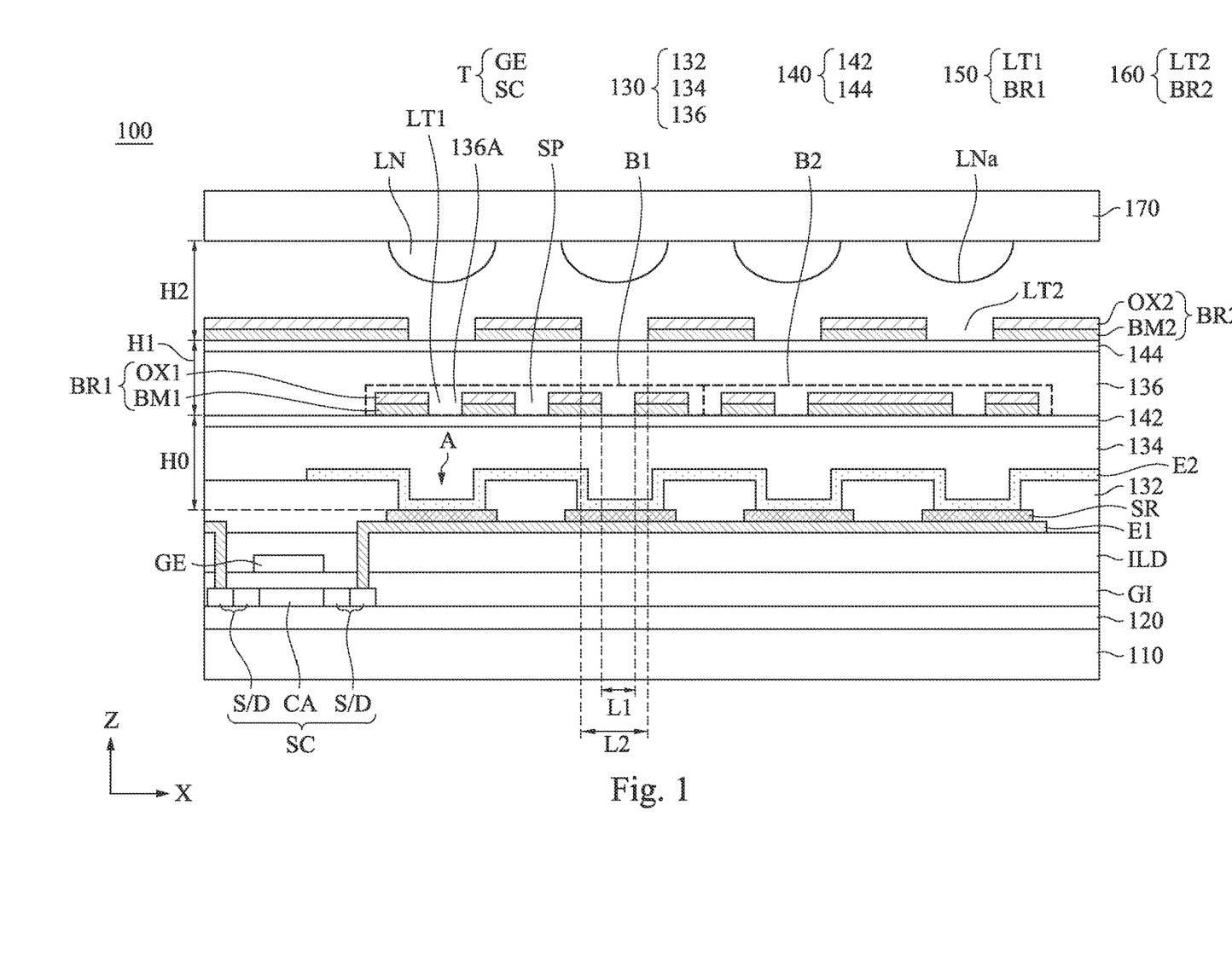
FIG. 1 depicts a schematic cross-sectional view of a biometric identification device according to some embodiments of the present disclosure.

FIG. 1 depicts a cross-sectional view of a biometric identification device 100 according to some embodiments of the present disclosure.

The biometric identification device 100 includes a substrate 110, a buffer layer 120, an active device T, a gate dielectric layer GI, an interlayer dielectric layer ILD, a plurality of photosensitive devices SR, a first electrode layer E1, a second electrode layer E2, an insulating layer 130, a dielectric layer 140, a plurality of first light-shielding parts 150, a second light-shielding part 160, microlenses LN, and a cover plate 170.

In some embodiments, the biometric identification device 100 can be applied to fingerprint identification, and the biometrics identified by the biometric identification device 100 may be, for example, features in ridges and valleys of a fingerprint. However, the present disclosure is not limited in this regard. In some other embodiments, the biometric identification device 100 can be applied to palm print identification, and the biometrics identified by the biometric identification device 100 may be features in ridges and valleys of a palm print. To simplify matters, fingerprint identification is taken for example in the following description.

In some embodiments, the substrate 110 may be a light-transmitting material. For example, the substrate 110 may be a glass substrate, a quartz substrate, a sapphire substrate, an organic polymer substrate, or some other suitable rigid substrate or flexible substrate (soft substrate), etc.

The buffer layer 120 is disposed on the substrate 110. The active device T is disposed on the buffer layer 120. The interlayer dielectric layer ILD is disposed on the active device T. The photosensitive devices SR are disposed on the first electrode layer E1. Hence, the photosensitive devices SR are electrically connected to the active device T through the first electrode layer E1. In some embodiments, a material of the photosensitive device SR is silicon-rich oxide (SRO) or some other suitable materials. In some embodiments, a material of the first electrode layer E1 is a metallic material, such as an opaque metallic material.

The active device T includes a semiconductor layer SC and a gate electrode GE located on the semiconductor layer SC. The semiconductor layer SC includes source/drain areas SID and a channel area CA connecting the source/drain areas S/D. In some embodiments, the channel area is polysilicon, and the source/drain areas S/D are doped polysilicon. In some other embodiments, the source/drain areas S/D may be an alloy, a nitride of metallic materials, an oxide of metallic materials, an oxynitride of metallic materials, or some other suitable material.

In some embodiments, the semiconductor layer SC is formed on the buffer layer 120 by patterning, and then the gate dielectric layer GI covers the semiconductor layer SC. The gate electrode GE is formed on the gate dielectric layer GI by patterning. The source/drain areas S/D are formed after the semiconductor layer SC is doped, and an undoped area in the semiconductor layer SC (located underneath the gate electrode GE) is the channel area CA. The interlayer dielectric layer ILD is formed on the gate dielectric layer GI and covers the gate electrode GE. After that, openings are formed in the gate dielectric layer GI and the interlayer dielectric layer ILD (through the gate dielectric layer GI and the interlayer dielectric layer ILD), and the metallic material is deposited in the openings and the metallic material is patterned to form the first electrode layer E1 in the openings and on the interlayer dielectric layer ILD. The photosensitive devices SR are thereafter disposed on the first electrode layer E1, so that the source/drain areas S/D and the photosensitive devices SR are electrically connected through the first electrode layer E1.

An insulating layer 132 is disposed on the first electrode layer E1 and the interlayer dielectric layer ILD. In some embodiments, the insulating layer 132 partially covers the photosensitive devices SR (for example, covers outer edge areas of the photosensitive devices SR, as shown in FIG. 1, that is, the insulating layer 132 forms a recess A on each of the photosensitive devices SR).

In some embodiments, a material of the insulating layer 132 may be a transparent insulating material, such as organic silicone rubber, acrylic resin, unsaturated polyester, polyurethane, epoxy resin, some other suitable material, a derivative of the above, or a combination thereof.

The second electrode layer E2 is disposed on the insulating layer 132 and the photosensitive devices SR. In some embodiments, the second electrode layer E2 extends into the recesses A to cover a part of the photosensitive devices SR (for example, covers center areas of the photosensitive devices SR) and is electrically connected to the photosensitive devices SR (for example, as shown in FIG. 1).

In some embodiments, a material of the second electrode layer E2 includes a transparent conductive material, such as indium tin oxide (ITO), indium zinc oxide, aluminum tin oxide, aluminum zinc oxide, indium gallium zinc oxide, some other suitable oxide, or a stack layer of at least two of the above.

An insulating layer 134 is disposed on the insulating layer 132 and the second electrode layer E2. A material of the insulating layer 134 may be the same as or similar to that of the insulating layer 132, and a description in this regard is not provided.

A dielectric layer 142 is disposed on the insulating layer 134. The plurality of first light-shielding parts 150 are disposed on the dielectric layer 142. Each of the first light-shielding parts 150 has a first light-transmitting area LT1 and a first light-shielding area BR1 surrounding the first light-transmitting area LT1. Each of the first light-transmitting areas LT1 respectively corresponds to and overlap with each of the photosensitive devices SR (for example, a center point of each of the first light-transmitting areas LT1 respectively overlaps with a center point of each of the photosensitive devices SR), and at least two of the first light-shielding parts 150 are spaced apart by a spacer area SP.

In some embodiments, a material of the dielectric layer 142 may be an organic material, an inorganic material, or a combination thereof, which includes but not limited to, epoxy resin, silicon oxide ($SiO_x$), silicon nitride ($SiN_x$), a composite layer composed of silicon oxide and silicon nitride, or some other suitable dielectric materials. In some embodiments, the dielectric layer 142 is a transparent insulating material.

In some embodiments, a material of the first light-shielding area BR1 may be an inorganic material, an organic material, a metal, some other suitable material, or a combination thereof.

It is worth emphasizing that there is a process limitation that a length L1 of the first light-transmitting area LT1 is greater than 5 microns (μm) if the first light-shielding area BR1 is made of the inorganic or organic material. However, when the material of the first light-shielding area BRI is the metal, it can have a better process precision. For example, the length L1 of the first light-transmitting area LT1 ranging less than 5 μm can be achieved (for example, from 2.5 μm to 5 μm). In some embodiments, the first light-shielding area BR1 includes a first light-shielding metal layer BM1 and a first metal oxide layer OX1 disposed on the first light-shielding metal layer BM1.

Figure 2A:
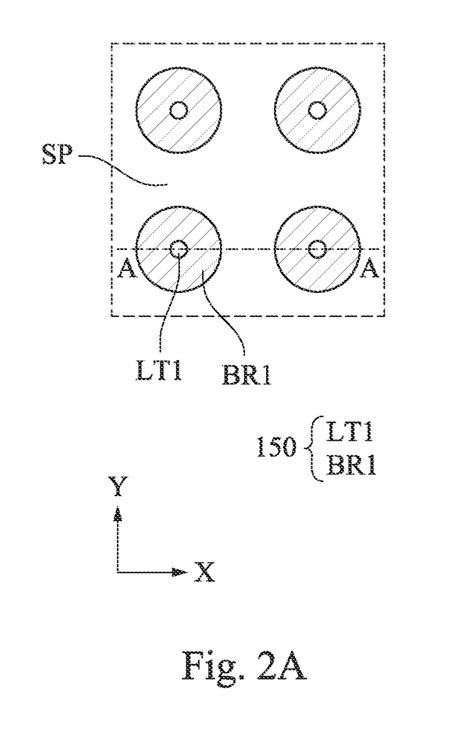
FIG. 2A depicts a top view of a first block in a biometric identification device according to some embodiments of the present disclosure.

In some embodiments, the first light-shielding parts 150 are all spaced apart by the spacer area SP. For example, a description is provided with reference to a first block B1 of FIG. 1 and FIG. 2A. FIG. 2A depicts a top view of the first block B1 in the biometric identification device 100 according to some embodiments of the present disclosure. The cross-section taken along line A-A in FIG. 2A is the first light-shielding parts 150 and the spacer area SP in the first block B1 of FIG. 1. The first light-shielding parts 150 all have the spacer area SP between them.

In addition, it is worth emphasizing that when the first light-shielding area BR1 is made of the metal, a contact area between the first light-shielding area BR1 (especially the first light-shielding metal layer BM1) and the dielectric layer 142 can be reduced through the design of the spacer area SP, thus reducing a parasitic capacitance between the first light-shielding area BR1 and the dielectric layer 142. As a result, the interference of the stray capacitance can be reduced to increase the accuracy of fingerprint signal detection.

Figure 2B:
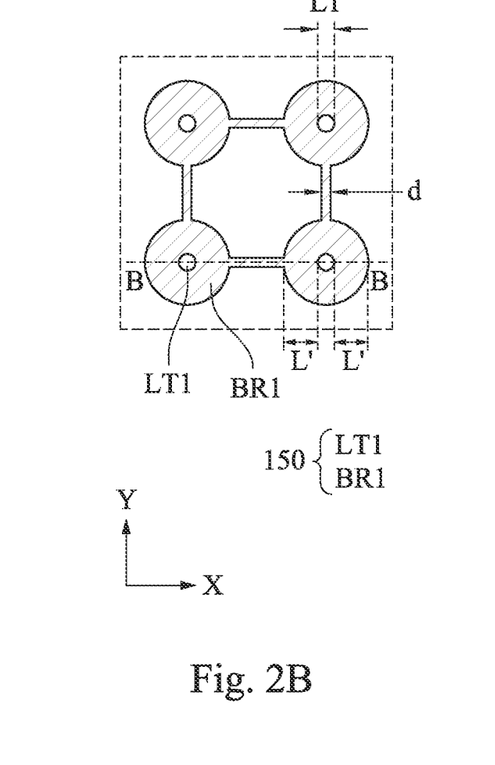
FIG. 2B depicts a top view of a second block in a biometric identification device according to some embodiments of the present disclosure.

In some other embodiments, although a part of the first light-shielding parts 150 are separated by the spacer area SP, another part of the first light-shielding parts 150 are connected through the first light-shielding area BR1. For example, a description is provided with reference to a second block B2 of FIG. 1 and FIG. 2B. FIG. 2B depicts a top view of the second block B2 in the biometric identification device 100 according to some embodiments of the present disclosure. The cross-section taken along the line B-B in FIG. 2B is the first light-shielding parts 150 in the second block B2 of FIG. 1. In FIG. 2B, the first light-shielding part 150 is respectively connected to another adjacent first light-shielding part 150 in the X-axis direction and still another adjacent first light-shielding part 150 in the Y-axis direction.

With additional reference to FIG. 2B, when viewed from the top, a diameter d of the first light-shielding area BR1 connected to the first light-shielding parts 150 along the X-axis direction is smaller than a length of the first light-shielding part 150 (twice of a vertical length L' from a contour edge of the first light-shielding area BR1 to a contour edge of the first light-transmitting area LT1 (2L')+a length L1 of the first light-transmitting area LT1) to reduce a contact area between the first light-shielding area BR1 and the dielectric layer 142. A parasitic capacitance is reduced to reduce the interference of the stray capacitance so as to increase the accuracy of fingerprint signal detection.

Figure 2C:
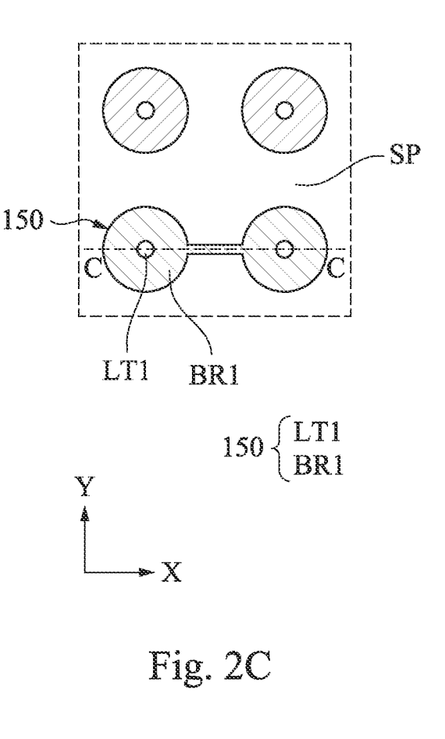
FIG. 2C depicts a top view of a second block in a biometric identification device according to some other embodiments of the present disclosure.

It should be understood that the first light-shielding parts 150 can be connected to each other by using any method, and a description in this regard is not provided here. For example, a description is provided with reference to the second block B2 of FIG. 1 and FIG. 2C. FIG. 2C depicts a top view of the second block B2 in the biometric identification device 100 according to some other embodiments of the present disclosure. The cross-section taken along line C-C in FIG. 2C is the first light-shielding parts 150 in the second block B2 of FIG. 1. In FIG. 2C, the first light-shielding part 150 at the lower left of FIG. 2C is connected to another adjacent first light-shielding part 150 in the X axis direction, and is not connected to still another adjacent first light shielding part 150 in the Y axis direction. However, the two first light-shielding parts 150 on the upper side of FIG. 2C are not connected to any adjacent first light-shielding parts 150.

Figure 2D:
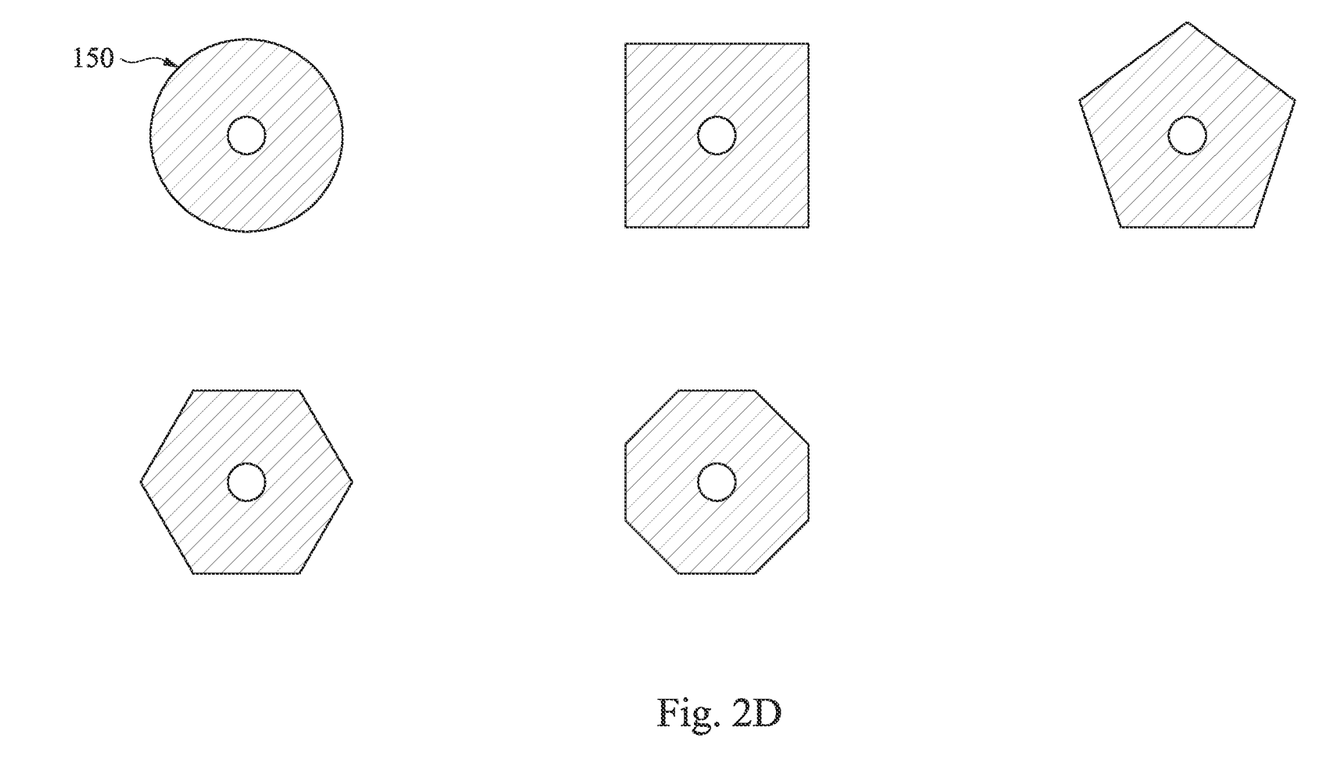
FIG. 2D depicts a contour shape of a first light-shielding part in a biometric identification device according to some embodiments of the present disclosure when viewed from the top.

In some embodiments, a description is provided with reference to FIG. 2D. FIG. 2D depicts a contour shape of the first light-shielding part 150 in the biometric identification device 100 according to some embodiments of the present disclosure when viewed from the top. In the examples of FIG. 2D, the contour shape of the first light-shielding part 150 includes a circle, a square, a pentagon, a hexagon, or an octagon when viewed from the top. It should be understood that when the first light-shielding area BR1 (see FIG. 1) is the metal, the contour shape of the first light-shielding part 150 adopts the circle. As compared with the other shapes, the contact area between the first light-shielding area BR1 and the dielectric layer 142 can be minimized while taking into account the light-shielding effect. The parasitic capacitance is reduced to reduce the interference of the stray capacitance so as to increase the accuracy of fingerprint signal detection.

With additional reference to FIG. 1, an insulating layer 136 is disposed on the dielectric layer 142 and the first light-shielding metal layers BM1, and fills up the first light-transmitting areas LT1 and the spacer area SP. A material of the insulating layer 136 may be the same as or similar to that of the insulating layer 132, and a description in this regard is not provided.

Figure 3A:
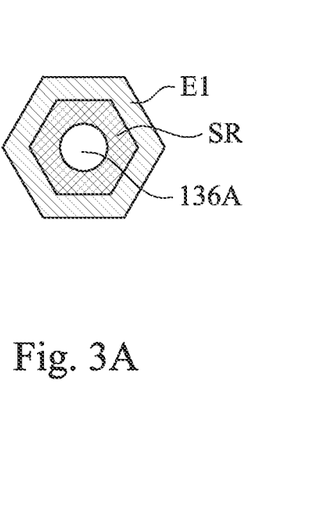
FIG. 3A depicts a top view of a first electrode layer, a photosensitive device, and portions of an insulating layer filling up a first light-transmitting area of a biometric identification device according to some embodiments of the present disclosure.

Next, a description is provided with reference to FIG. 3A to FIG. 3E. FIG. 3A depicts a top view of the first electrode layer E1, the photosensitive device SR, and portions of the insulating layer 136A filling up the first light-transmitting area of the biometric identification device 100 according to some embodiments of the present disclosure. FIG. 3B to FIG. 3E respectively depict top views of layers of the first electrode layer E1, the photosensitive devices SR, the second electrode layer E2, and the portions of the insulating layer 136A filling up the first light-transmitting area LT1 of the biometric identification device 100 according to some embodiments of the present disclosure. Contour shapes of the first electrode layer E1, the photosensitive devices SR, and the second electrode layer E2 are basically hexagons (for example, a regular hexagon) when viewed from the top, and a contour shape of the portions of the insulating layer 136A may be a circle when viewed from the top. The connection method of the circuit (the component of each of the layers) can be adjusted depending on the practical application of the circuit.

Figure 3B:
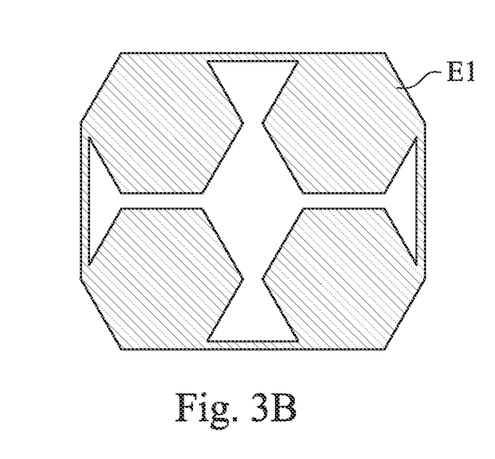
FIG. 3B to FIG. 3E respectively depict top views of layers of a first electrode layer, photosensitive devices, a second electrode layer, and portions of an insulating layer filling up a first light-transmitting area of a biometric identification device according to some embodiments of the present disclosure.
Figure 3C:
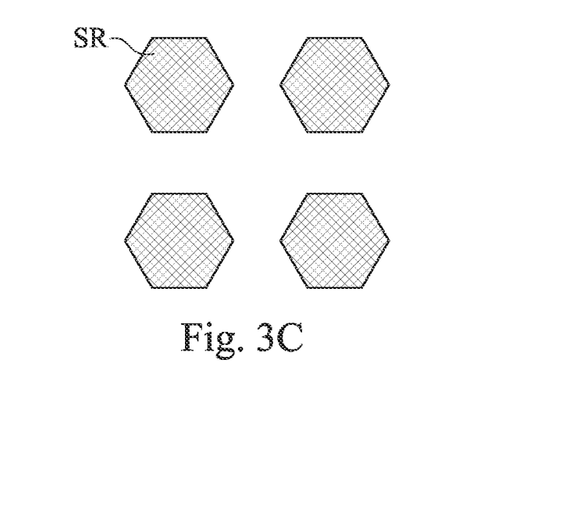
Figure 3D:
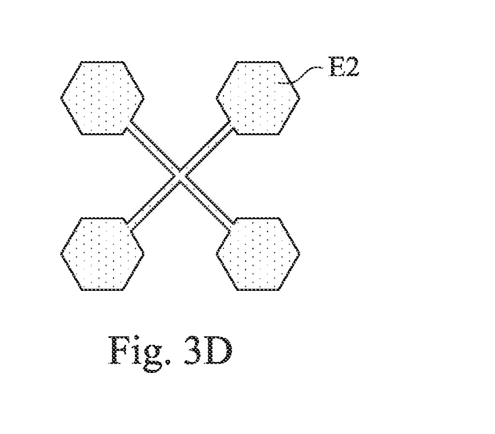
Figure 3E:
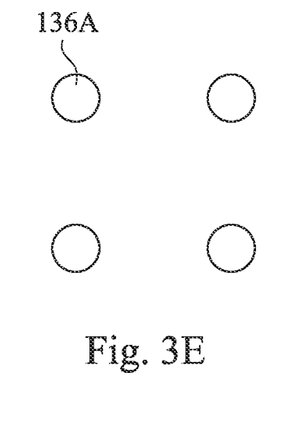

For example, in FIG. 3B the first electrode layer E is formed by a group of four hexagons arranged in an array, and outer contours of the four hexagons are extended and connected. In FIG. 3D, the second electrode layer E2 is formed by a group of four hexagons arranged in an array, and the four hexagons are cross-connected. In FIG. 3C, the photosensitive devices SR are individual hexagons and are not connected to one another.

Figure 4A:
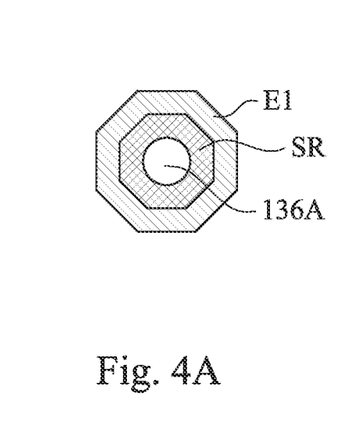
FIG. 4A depicts a top view of a first electrode layer, a photosensitive device, and portions of an insulating layer filling up a first light-transmitting area of a biometric identification device according to some other embodiments of the present disclosure.
Figure 4B:
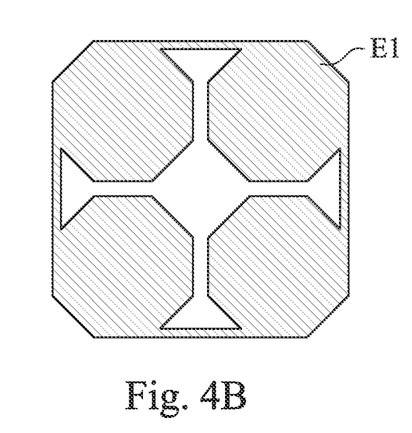
FIG. 4B to FIG. 4E respectively depict top views of layers of a first electrode layer, photosensitive devices, a second electrode layer, and portions of an insulating layer filling up a first light-transmitting areas of a biometric identification device according to some other embodiments of the present disclosure.
Figure 4C:
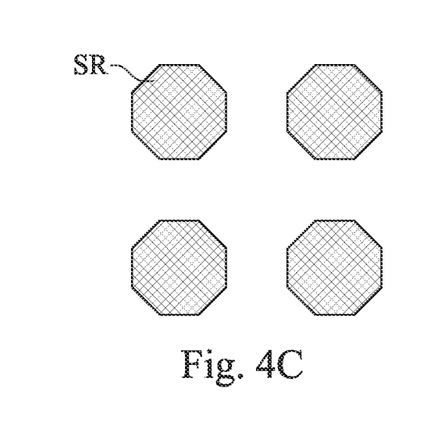
Figure 4D:
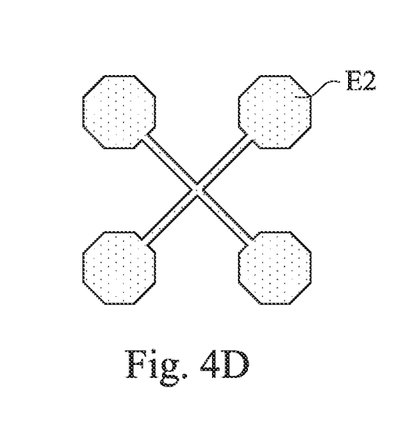
Figure 4E:
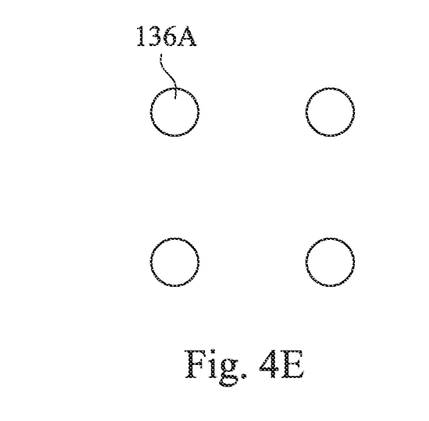

It should be understood that the contour shapes of the first electrode layer E1, the photosensitive devices SR, and the second electrode layer E2 are not limited to hexagons when viewed from the top. For example, a description is provided with reference to FIG. 4A to FIG. 4E. FIG. 4A depicts a top view of the first electrode layer E1, the photosensitive device SR, and the portions of the insulating layer 136A filling up the first light-transmitting area LT1 of the biometric identification device 100 according to some other embodiments of the present disclosure. FIG. 4B to FIG. 4E respectively depict top views of the layers of the first electrode layer E1, the photosensitive devices SR, the second electrode layer E2, and the portions of the insulating layer 136A filling up the first light-transmitting areas LT1 of the biometric identification device 100 according to some other embodiments of the present disclosure.

FIG. 4A to FIG. 4E are basically the same as FIG. 3A to FIG. 3E. The difference lies in that the contour shapes of the first electrode layer E1, the photosensitive devices SR, and the second electrode layer E2 are basically octagons when viewed from the top.

With additional reference to FIG. 1, a dielectric layer 144 is then disposed on the insulating layer 136. A second light-shielding part 160 is disposed on the dielectric layer 144. The second light-shielding part 160 has a plurality of second light-transmitting areas LT2 and a second light-shielding area BR2 located between two adjacent second light-transmitting areas LT2. Each of the second light-transmitting areas LT2 respectively corresponds to each of the first light-transmitting areas LT1 (for example, a center point of each of the second light-transmitting areas LT2 respectively overlap with a center point of each of the first light-transmitting areas LT1), and an orthogonal projection of at least a part of the spacer area SR on the substrate 110 is within an orthogonal projection of the second light-shielding area BR2 on the substrate 110. In some embodiments, an orthogonal projection of all the spacer area SR on the substrate 110 is within an orthogonal projection of the second light-shielding area BR2. The second light-shielding area BR2 shields all the spacer area SP to avoid the spacer area SR to be exposed, which causes stray light to irradiates on the photosensitive devices SR through the spacer area SP and interfere with fingerprint signal detection.

In some embodiments, a material of the dielectric layer 144 may be the same as or similar to that of the dielectric layer 142, and a description in this regard is not provided.

In some embodiments, a material of the second light-shielding area BR2 may be an inorganic material, an organic material, a metal, some other suitable material, or a combination thereof. In some embodiments, the second light-shielding area BR2 includes a second light-shielding metal layer BM2 and a second metal oxide layer OX2 disposed on the second light-shielding metal layer BM2. In some embodiments, a length L2 of the second light-transmitting area LT2 is greater than or equal to the length L1 of the first light-transmitting area LT1.

A description is provided with reference to FIG. 1. A plurality of microlenses LN are disposed above the second light-shielding part 160. Each of the microlenses LN respectively corresponds to each of the second light-transmitting areas LT2 (for example, a center point of each of the second light-transmitting areas LT2 is respectively located on a perpendicular bisector of each of the microlenses LN).

In some embodiments, the fingerprint image of the finger can be obtained by adjusting a curvature radius of the microlens LN and a position of a convex portion LNa of the microlens LN to adjust the imaging of the reflected light (for example, amplify the external light signal through the microlens LN).

The cover plate 170 is disposed on the microlenses LN. For example, in FIG. 1, the microlenses LN are directly connected to the cover plate 170.

In some embodiments, the cover plate 170 includes at least one of a protection plate, a touch panel, and a display panel, so as to provide the function of protecting the microlenses LN, or the function of touch, or even the function of displaying images.

Figure 5A:
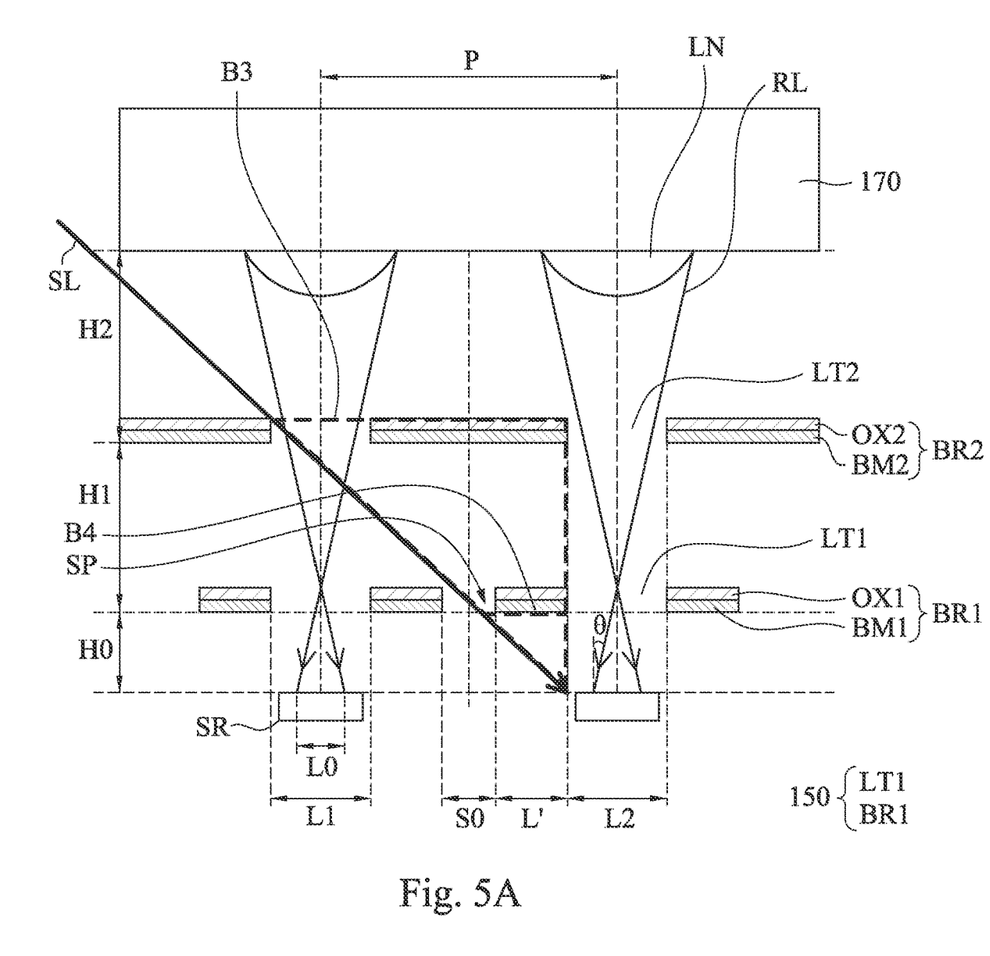
FIG. 5A depicts a schematic cross-sectional view illustrating a situation in which light rays propagate in a biometric identification device according to some embodiments of the present disclosure.
Figure 5B:
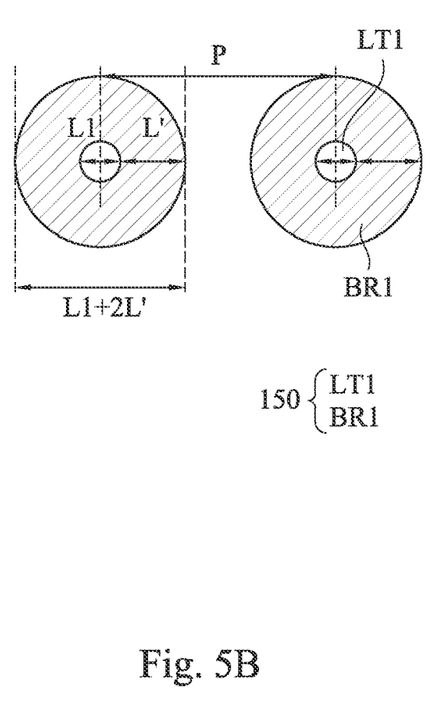
FIG. 5B depicts a top view of a part of the first light-shielding parts in FIG. 5A.

Next, a description is provided with reference to FIG. 5A and FIG. 5B. FIG. 5A depicts a schematic cross-sectional view illustrating a situation in which light rays (such as reflected light RL and stray light SL) propagate in the biometric identification device 100 according to some embodiments of the present disclosure. FIG. 5B depicts a top view of part of the first light-shielding parts 150 in FIG. 5A.

In FIG. 5A, a distance between the center points of the two adjacent second light-transmitting areas LT2 is defined as a distance P, the length of each of the second light-transmitting area LT2 is the length L2, a length of the spacer area SP is a length S0, the length of the first light-transmitting area LT1 is a length L1, a vertical length from the contour edge of the first light-shielding area BR1 to the contour edge of the first light-transmitting area LT1 is a vertical length L', and a length of a light range projected onto each of the photosensitive devices SR through each of the microlenses LN (or called as the light range of the reflected light RL) is the length L0. Under the premise of the relational expression 1: P−L2>S0 (the length of each of the second light-shielding areas BR2 is greater than the length S0 of the spacer area SP, in which the relational expression 2 of the length S0 is P−L1−2L'=S0), and the relational expression 3: L1+2L'>L0 (the length of each of the first light-shielding parts 150 is greater than the length L0 of the light range projected onto each of the photosensitive device SR through the individual microlenses LN), the stray light SL (for example, light rays with an incident angle greater than the maximum incident angle θ of the reflected light RL) can be prevented from entering the photosensitive device SR through the spacer area SP. That is to say, designing the component lengths and distances satisfying the relational expressions 1 to 3 can avoid the interference of the stray light SL incident from the spacer area SP to improve the accuracy of fingerprint signal detection. At the same time, the space area SP is retained to reduce the parasitic capacitance between the first light-shielding area BR1 and the dielectric layer 142.

In some embodiments, a range of the length S0 of the spacer area SP is 10 μm≥S0≥2.5 μm. In some embodiments, a range of the vertical length L' from the contour edge of the first light-shielding area BR1 to the contour edge of the first light-transmitting area LT1 is 10 μm≥vertical length L'≥2.5 μm.

In some embodiments, a range of the length L2 of each of the second light-transmitting areas LT2 is 10 μm≥length L2≥2.5 μm. In some embodiments, a range of the length L1 of the first light-transmitting area LT1 is 8 μm≥length L1≥2.5 μm. In some embodiments, a range of the length L0 of the light range projected onto each of the photosensitive devices SR through each of the microlenses LN is 10 μm≥length L0≥2.5 μm.

In FIG. 5A, a distance from top surfaces of the photosensitive devices SR to a top surface of the dielectric layer 142 (the dielectric layer 142 is omitted in FIG. 5A, and the dielectric layer 142 can be referred to FIG. 1) is a distance H0, a distance from the top surface of the dielectric layer 142 to a top surface of the dielectric layer 144 (the dielectric layer 144 is omitted in FIG. 5A, and the dielectric layer 144 can be referred to FIG. 1) is a distance H1, and a distance from the top surface of the dielectric layer 144 to the cover plate 170 is a distance H2. According to the principle that the lengths of the sides of the triangles are in an equal proportion when the angles of the triangles are the same (for example, please refer to the triangle block B3 and the triangle block B4), the relationships between the distance H0, the distance H1, the length L', the length S0, the distance P, and the length L1 (for example $$\left(\frac{1}{2}S0+L'\right):H0=\left(P+\frac{1}{2}L1\right):(H0+H1),$$

in which thicknesses of the first light-shielding area BR1 and the second light-shielding area BR2 are extremely small and are ignored here) are substituted into the relational expressions 1 to 3 (Relational expression 1: L1+2L'>L0, Relational expression 2: P−L1−2L'=S0 and Relational expression 3: P−L2>S0), and the relational expression 4 is obtained after arranging:

$$L' \leq \frac{L0}{2}-\frac{L1}{2}+\frac{\left(P+\frac{L2}{2}-\frac{L0}{2}\right)H0}{H0+H1}$$

Since the first light-shielding area BR1 is directly disposed on the dielectric layer 142, in FIG. 5A, the top surface of the dielectric layer 142 can also be understood as a bottom surface of the first light-shielding area BR1. In addition to that, since the second light-shielding area BR2 is directly disposed on the dielectric layer 144, in FIG. 5A, the top surface of the dielectric layer 144 can also be understood as a bottom surface of the second light-shielding area BR2.

In some embodiments, a range of the distance H0 from the top surfaces of the photosensitive devices SR to the top surface of the dielectric layer 142 (not shown in FIG. 5A), or called as a distance from the top surfaces of the photosensitive devices SR to the bottom surface of the first light-shielding area BR1, is 6 μm≥Distance H0≥2 μm. In some embodiments, a range of the distance H1 from the top surface of the dielectric layer 142 (not shown in FIG. 5A) to the top surface of the dielectric layer 144 (not shown in FIG. 5A), or called as a distance from the bottom surface of the first light-shielding area BR1 to the bottom surface of the second light-shielding area BR2, is 30 μm≥Distance H1≥5 μm.

In some embodiments, when the length L1 is 4 μm, the length L2 is 6.5 μm, the vertical length L' is 5 μm, the distance H0 is 5 μm, and the distance H1 is 10 μm (and the length S0 is 2.9 μm derived from the relational expression 2), the relational expressions 1 to 4 can be met. The technical effect of blocking the stray light SL from entering the photosensitive devices SR is achieved.

In some other embodiments, the microlenses LN of the biometric identification device 100 may have different configurations.

Figure 6A:
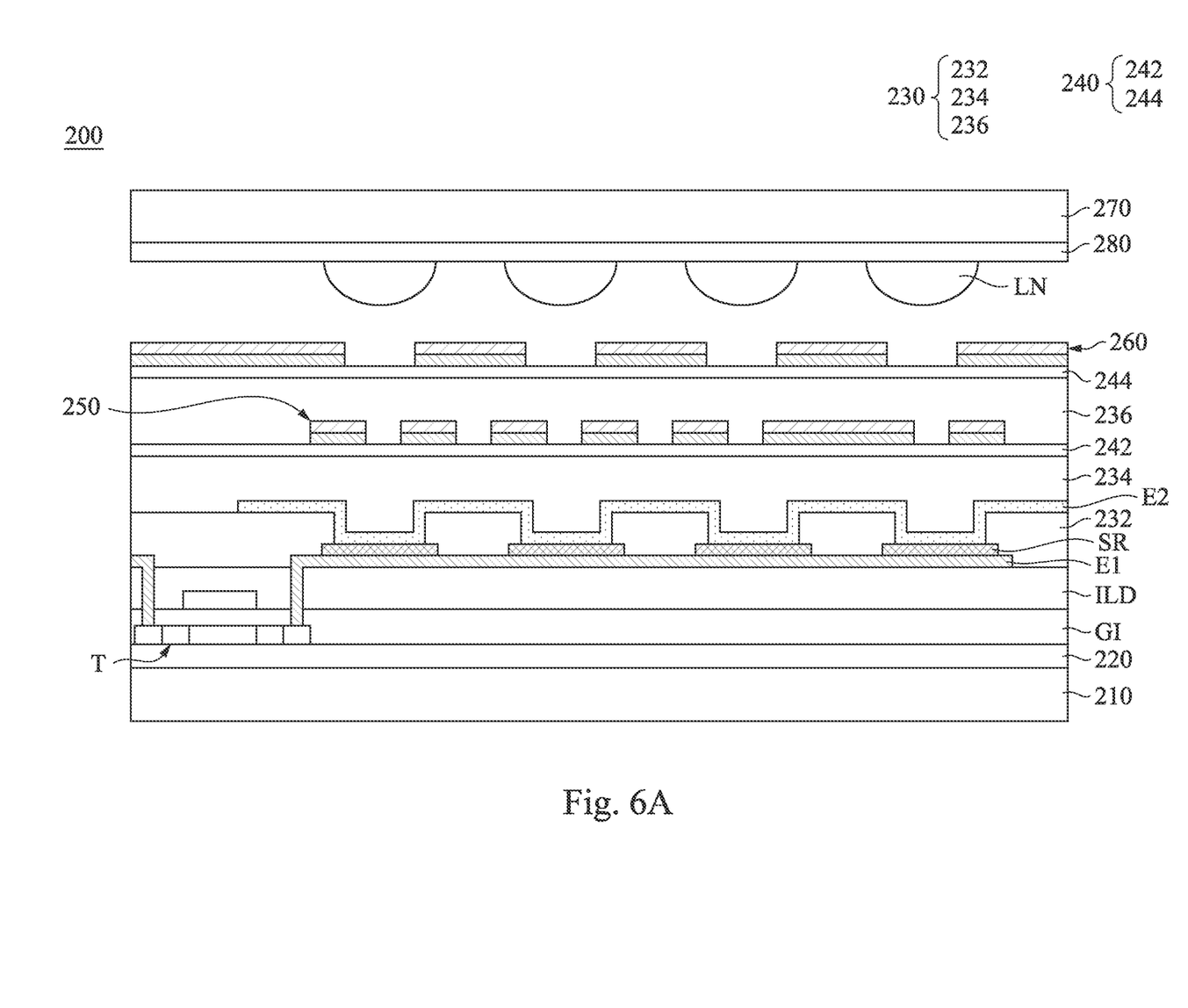
FIG. 6A depicts a schematic cross-sectional view of a biometric identification device according to some other embodiments of the present disclosure.

For example, a description is provided with reference to FIG. 6A. FIG. 6A depicts a schematic cross-sectional view of a biometric identification device 200 according to some other embodiments of the present disclosure. The component configuration of FIG. 6A is basically similar to that of FIG. 1. The difference lies in that the microlenses LN in FIG. 6A are connected to the cover plate 270 via an adhesive layer 280. In some embodiments, the adhesive layer 280 is an optical clear adhesive.

In some other embodiments, the microlenses LN can be disposed on a second light-shielding part 260 with the convex portions facing upward. In some embodiments, an insulating layer can be selectively added between the microlenses LN and the second light-shielding part 260.

Figure 6B:
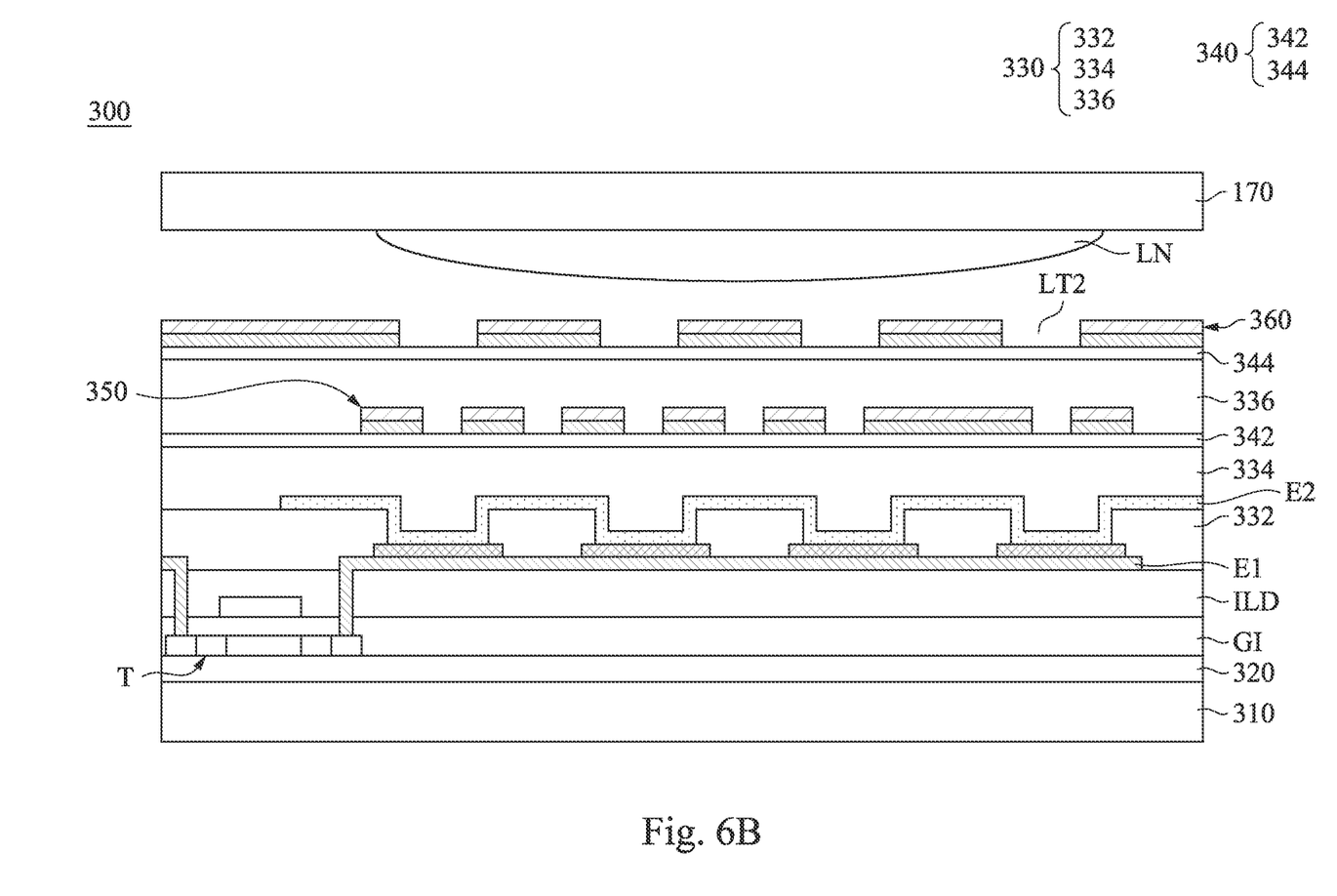
FIG. 6B depicts a schematic cross-sectional view of a biometric identification device according to still some other embodiments of the present disclosure.

For example, a description is provided with reference to FIG. 6B. FIG. 6B depicts a schematic cross-sectional view of a biometric identification device 300 according to still some other embodiments of the present disclosure. The component configuration of FIG. 6B is basically similar to that of FIG. 1. The difference lies in that in FIG. 6B the single microlens LN is disposed above a plurality of second light-shielding parts 360. Orthogonal projections of the second light-transmitting areas LT2 on a substrate 310 are within an orthogonal projection of the microlens LN on the substrate 310, that is, the single microlens LN corresponds to the plurality of second light-transmitting areas LT2.

Some embodiments of the present disclosure provide a biometric identification device. At least one group of the adjacent first light-shielding parts are spaced apart by the spacer area, so as to prevent the first light-shielding parts from extending to cover the entire dielectric layer. The parasitic capacitance generated when the first light-shielding area in the first light-shielding parts contacts the dielectric layer is reduced, and the interference of the stray capacitance is reduced. The response to the biometric signals is improved to increase the accuracy of biometric detection.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:
1. A biometric identification device comprising:
a substrate;
an electrode layer disposed on the substrate, wherein the electrode layer is continuous;
a plurality of photosensitive devices disposed on the electrode layer, wherein the plurality of photosensitive devices are spaced apart from each other and electrically connected to the electrode layer;
one active device connected to the plurality of photosensitive devices through the electrode layer;
a first dielectric layer disposed on the plurality of photosensitive devices;
a plurality of first light-shielding parts disposed on the first dielectric layer, wherein each of the plurality of first light-shielding parts has a first light-transmitting area and a first light-shielding area surrounding the first light-transmitting area, the first light-transmitting area respectively corresponds to and overlaps with each of the plurality of photosensitive devices, and at least two of the plurality of first light-shielding parts are spaced apart by a spacer area;

a second dielectric layer disposed on the plurality of first light-shielding parts; and a second light-shielding part disposed on the second dielectric layer, wherein the second light-shielding part has a plurality of second light-transmitting areas and a second light-shielding area located between two adjacent second light-transmitting areas, each of the plurality of second light-transmitting areas respectively corresponds to the first light-transmitting area, and an orthogonal projection of all of the spacer area on the substrate is within an orthogonal projection of the second light-shielding area on the substrate.

2. The biometric identification device of claim 1, wherein the plurality of first light-shielding parts are all spaced apart by the spacer area.

3. The biometric identification device of claim 1, wherein a part of the plurality of first light-shielding parts are connected through the first light-shielding area.

4. The biometric identification device of claim 1, wherein a material of the first light-shielding area is a metal.

5. The biometric identification device of claim 4, wherein a range of a length of the first light-transmitting area is from 2.5 µm to 5 µm.

6. The biometric identification device of claim 1, wherein a contour shape of one of the plurality of first light-shielding parts comprises a circle, a square, a pentagon, hexagon, or an octagon when viewed from a top.

7. The biometric identification device of claim 1, wherein a distance between center points of the two adjacent second light-transmitting areas is defined as P, a length of each of the plurality of second light-transmitting areas is L2, a length of the spacer area is S0, a length of the first light-transmitting area is a L1, a vertical length from a contour edge of the first light-shielding area to a contour edge of the first light-transmitting area is L', and a length of a light range projected onto each of the plurality of photosensitive devices through a microlens is L0, then

P−L2>S0;

P−L1−2L'=S0; and

L1+2L'>L0.

8. The biometric identification device of claim 7, wherein:
a range of the length S0 of the spacer area is 10 µm≥S0≥2.5 µm; and
a range of the vertical length L' from the contour edge of the first light-shielding area to the contour edge of the first light-transmitting area is 10 µm≥L'≥2.5 µm.

9. The biometric identification device of claim 7, wherein:
a range of the length L2 of each of the plurality of second light-transmitting areas is 10 µm≥L2≥2.5 µm;
a range of the length L1 of the first light-transmitting area is 8 um >L1 ≥2.5 um;
a range of the length L0 of the light range is 10 µ≥L0≥2.5 µm;
a range of the distance H0 from a top surface of each of the plurality of photosensitive devices to a top surface of the first dielectric layer is 6 µm≥H0≥2 µm; and
a range of the distance H1 from the top surface of the first dielectric layer to a top surface of the second dielectric layer is 30 µm≥H1≥5 µm.

10. The biometric identification device of claim 1, wherein a distance between center points of the two adjacent second light-transmitting areas is defined as P, a length of each of the plurality of second light-transmitting areas is L2, a length of the spacer area is S0, a length of the first light-transmitting area is L1, a vertical length from a contour edge of the first light-shielding area to a contour edge of the first light-transmitting area is L', a length of a light range projected onto each of the plurality of photosensitive devices through a microlens is L0, a distance from a top surface of each of the photosensitive devices to a top surface of the first dielectric layer is H0, and a distance from the top surface of the first dielectric layer to a top surface of the second dielectric layer is H1, then $$L' \leq \frac{L0}{2} - \frac{L1}{2} + \frac{\left(P + \frac{L2}{2} - \frac{L0}{2}\right)H0}{H0 + H1}.$$

11. The biometric identification device of claim 10, wherein:
a range of the length S0 of the spacer area is 10 µm≥S0≥2.5 µm; and
a range of the vertical length L' from the contour edge of the first light-shielding area to the contour edge of the first light-transmitting area is 10 µm≥L'≥2.5 µm.

12. The biometric identification device of claim 10, wherein:
a range of the length L2 of each of the plurality of second light-transmitting areas is 10 µm≥L2≥2.5 µm;
a range of the length L1 of the first light-transmitting area is 8 µm≥L1≥2.5 µm;
a range of the length L0 of the light range is 10 µm≥L0≥2.5 µm;
a range of the distance H0 from the top surface of each of the plurality of photosensitive devices to the top surface of the first dielectric layer is 6 µm≥H0≥2 µm; and
a range of the distance H1 from the top surface of the first dielectric layer to the top surface of the second dielectric layer is 30 µm≥H1≥5 µm.

13. The biometric identification device of claim 1, wherein the first light-shielding area comprises a first light-shielding metal layer and a first metal oxide layer disposed on the first light-shielding metal layer.

14. The biometric identification device of claim 1, wherein the second light-shielding area comprises a second light-shielding metal layer and a second metal oxide layer disposed on the second light-shielding metal layer.

15. The biometric identification device of claim 1, further comprising a microlens disposed above the second light-shielding part, wherein orthogonal projections of the plurality of second light-transmitting areas on the substrate are within an orthogonal projection of the microlens on the substrate.

16. The biometric identification device of claim 1, further comprising a plurality of microlenses disposed above the second light-shielding part, wherein each of the plurality of microlenses respectively corresponds to each of the plurality of second light-transmitting areas.

17. A biometric identification device comprising:
a substrate;
a first electrode layer disposed on the substrate, wherein the first electrode layer is continuous;
a plurality of photosensitive devices disposed on the first electrode layer, wherein the plurality of photosensitive devices are spaced apart from each other and electrically connected to the first electrode layer;
one active device connected to the plurality of photosensitive devices through the first electrode layer;

a first dielectric layer disposed on the plurality of photosensitive devices;

a plurality of first light-shielding parts disposed on the first dielectric layer, wherein each of the plurality of first light-shielding parts has a first light-transmitting area and a first light-shielding area surrounding the first light-transmitting area, the first light-transmitting area respectively corresponds to and overlaps with each of the plurality of photosensitive devices, and the plurality of first light-shielding parts are all spaced apart by a spacer area;

a second dielectric layer disposed on the plurality of first light-shielding parts;

a second light-shielding part disposed on the second dielectric layer, wherein the second light-shielding part has a plurality of second light-transmitting areas and a second light-shielding area located between two adjacent second light-transmitting areas, each of the plurality of second light-transmitting areas respectively corresponds to the first light-transmitting area, and a second layer disposed on the plurality of photosensitive devices, wherein an orthogonal projection of the spacer area on the substrate overlaps with an orthogonal projection of the first electrode layer on the substrate and an orthogonal projection of the second electrode layer on the substrate.

18. The biometric identification device of claim 17, further comprising a gap between two of the plurality of photosensitive devices, wherein an orthogonal projection of the spacer area on the substrate overlaps with an orthogonal projection of the gap on the substrate.

* * * * *